United States Patent [19]

Fergason et al.

[11] Patent Number: 4,732,456
[45] Date of Patent: Mar. 22, 1988

[54] SCATTERING DISPLAY FOR CONTRAST ENHANCEMENT INCLUDING TARGET

[75] Inventors: James L. Fergason, Atherton; Robert Parker, Alamo, both of Calif.

[73] Assignee: Taliq Corporation, Sunnyvale, Calif.

[21] Appl. No.: 53,583

[22] Filed: May 18, 1987

Related U.S. Application Data

[63] Continuation of Ser. No. 645,457, Aug. 28, 1984, abandoned.

[51] Int. Cl.⁴ .......................................... G02F 1/133
[52] U.S. Cl. ........................................ 350/334; 350/345
[58] Field of Search ............... 350/345, 355, 356, 354, 350/104-106, 97, 342, 338, 331 R, 339 D, 339 F, 351, 357, 346

[56] References Cited

U.S. PATENT DOCUMENTS

| | | | |
|---|---|---|---|
| 992,151 | 5/1911 | Berthon . | |
| 1,128,979 | 2/1915 | Hess . | |
| 2,202,354 | 5/1940 | De L. Saint Genies . | |
| 3,161,509 | 12/1964 | Howe et al. . | |
| 3,292,507 | 3/1965 | Vanstrum | 350/105 X |
| 3,457,400 | 7/1969 | Appeldorn . | |
| 3,576,364 | 4/1971 | Zanomi | 353/28 |
| 3,734,598 | 5/1973 | Aiken . | |
| 3,797,914 | 3/1974 | Aiken | 350/160 |
| 3,832,033 | 8/1974 | Furuhata et al. . | |
| 3,838,909 | 10/1974 | Fitzgibbons | 350/10 |
| 3,863,246 | 1/1975 | Trcka | 340/324 |
| 3,898,354 | 8/1975 | Parker | 350/351 |
| 3,905,682 | 9/1975 | Meyerhofer | 350/338 |
| 3,947,091 | 3/1976 | Trcka | 350/160 |
| 3,947,375 | 3/1976 | Gray et al. | 252/299 |
| 3,951,520 | 4/1976 | Waring, Jr. . | |
| 4,009,934 | 3/1977 | Goodwin et al. . | |
| 4,021,945 | 5/1977 | Sussman | 40/28 |
| 4,043,638 | 8/1977 | Kaufmann . | |
| 4,069,787 | 1/1978 | Wyckoff | 350/104 |
| 4,074,253 | 2/1978 | Nadir | 340/324 |
| 4,082,426 | 4/1978 | Brown | 350/97 X |
| 4,124,279 | 11/1978 | Byles | 350/345 |
| 4,190,330 | 2/1980 | Berreman | 350/331 |
| 4,264,147 | 4/1981 | Baur et al. | 350/345 |
| 4,278,328 | 7/1981 | Mukoh et al. | 350/346 X |
| 4,298,249 | 11/1981 | Gloor et al. | 350/338 |
| 4,300,818 | 11/1981 | Schachar | 351/7 |
| 4,349,817 | 9/1982 | Hoffman et al. | 340/784 |
| 4,365,869 | 12/1982 | Hareng et al. | 350/345 |
| 4,411,495 | 10/1983 | Beni et al. | 350/347 |
| 4,435,047 | 3/1984 | Fergason | 350/349 |
| 4,470,667 | 9/1984 | Okubo et al. | 350/334 X |
| 4,526,441 | 7/1985 | Dowden et al. | 350/357 |
| 4,556,289 | 12/1985 | Fergason | 350/350 |
| 4,579,423 | 4/1986 | Fergason | 350/334 |
| 4,591,233 | 5/1986 | Fergason | 350/334 |
| 4,596,445 | 6/1986 | Fergason | 350/339 |
| 4,602,945 | 8/1986 | Fergason | 350/331 |
| 4,605,284 | 8/1986 | Fergason | 350/334 |
| 4,606,611 | 8/1986 | Fergason | 350/334 |
| 4,613,207 | 9/1986 | Fergason | 350/331 |
| 4,616,903 | 10/1986 | Fergason | 350/334 |
| 4,662,720 | 5/1987 | Fergason | 350/339 |

FOREIGN PATENT DOCUMENTS

| | | |
|---|---|---|
| 2358415 | 11/1973 | Fed. Rep. of Germany ...... 350/338 |
| 0001016 | 3/1983 | PCT Int'l Appl. ................. 350/334 |
| 1442360 | 7/1976 | United Kingdom . |
| 1540878 | 2/1979 | United Kingdom . |

OTHER PUBLICATIONS

Werner E. L. Haas, *Scattering Electro Optic Cells*, Xerox Disclosure Journal, vol. 3, No. 5, Sep./Oct. 1978.

H. G. Craighead, Julian Cheng and S. Hackwood, *New Display Based on Electrically Induced Index Matching in an Inhomogeneous Medium*, Appl. Phys. Lett, 40(1), Jan. 1, 1982.

*Primary Examiner*—Stanley D. Miller
*Assistant Examiner*—David Lewis
*Attorney, Agent, or Firm*—Flehr, Hohbach, Test, Albritton & Herbert

[57] ABSTRACT

A display comprising optical means for presenting an absence of light over a controlled viewing angle and means for selectively scattering or transmitting light in response to a prescribed input to effect a display of information within said viewing angle.

24 Claims, 10 Drawing Figures

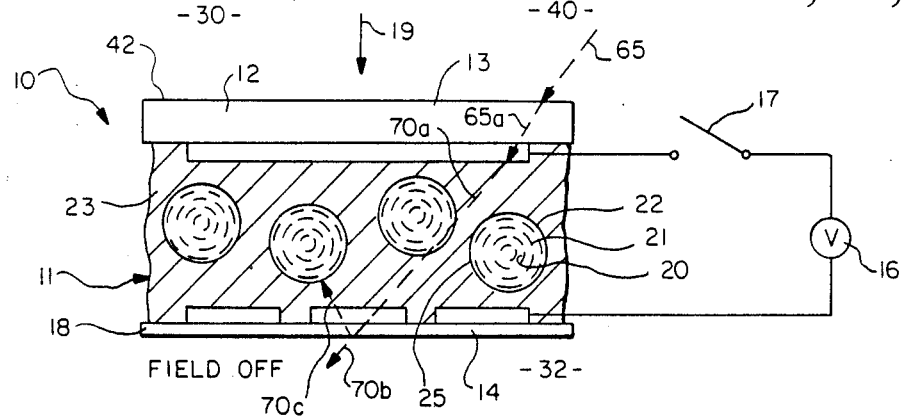
FIG. —1
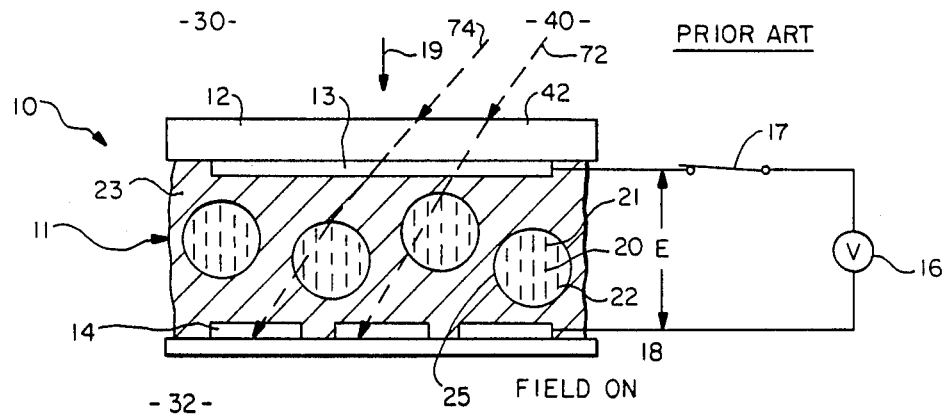
PRIOR ART
FIG. —2
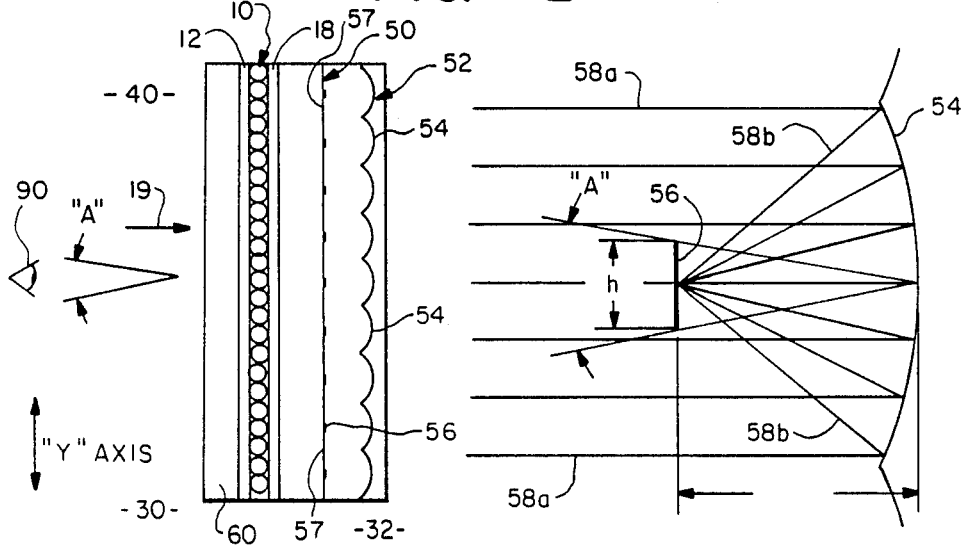
FIG. —3  FIG. —4

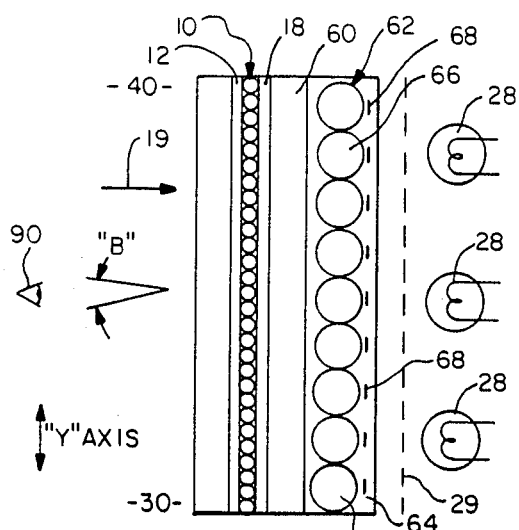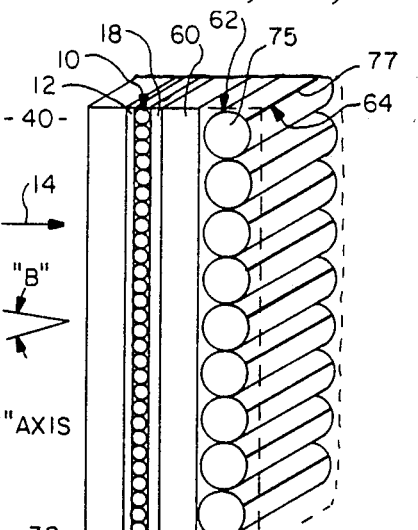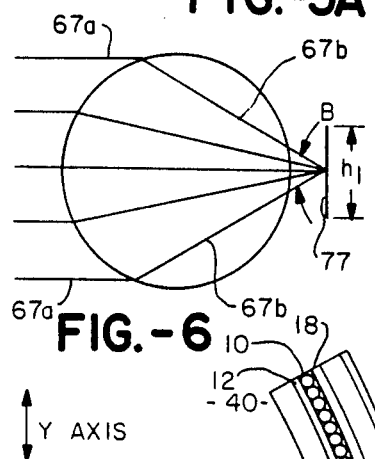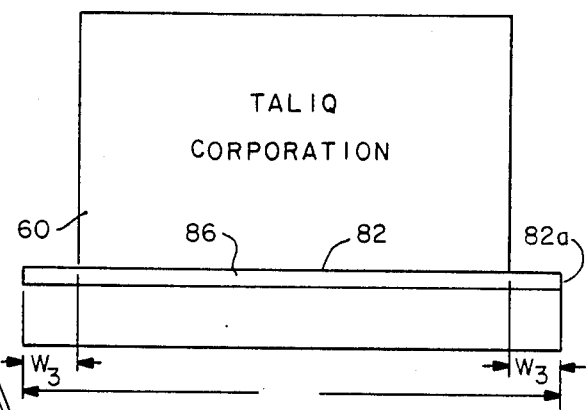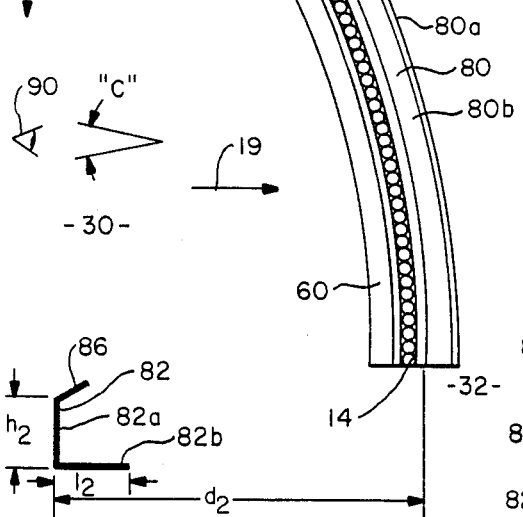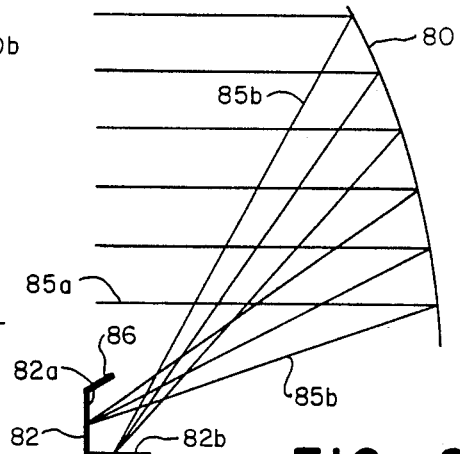

SCATTERING DISPLAY FOR CONTRAST ENHANCEMENT INCLUDING TARGET

This is a continuation of application Ser. No. 645,457 filed Aug. 18, 1984 and now abandoned.

The present invention relates generally to displays, and more particularly to displays including an optical system for enhancing a display of information.

Visual display devices may utilize liquid crystals. The property of liquid crystals that enables them to be used in visual displays is the ability of liquid crystals to transmit light in a strictly aligned or field-on state, and to scatter light and/or to absorb it (especially when combined with an appropriate dye) in a relatively free or field-off state. An electric field may be selectively applied across the liquid crystals to switch between field-off and field-on states.

Frequently a visual display device using liquid crystals displays dark characters on a gray or relatively light background. In such devices, it is desirable to improve the effective contrast between the characters displayed and the background, and to reduce or eliminate front surface glare from the display.

There are three categories of liquid crystal materials, namely, cholesteric, nematic and smectic. The present invention relates in a preferred embodiment described hereinafter to the use of nematic liquid crystal which is operationally nematic. By "operationally nematic" is meant that, in the absence of external fields, structural distortion of the liquid crystal is dominated by the orientation of the liquid crystal at its boundaries rather than by bulk effects, such as very strong twists (as in cholesteric material) or layering (as in smectic material). Thus, for example, a liquid crystal material including chiral ingredients which induce a tendency to twist but which cannot overcome the effects of the boundary alignment of the liquid crystal material would be considered to be operationally nematic. A more detailed explanation of operationally nematic liquid crystal material is provided in co-pending U.S. patent application Ser. No. 477,242, filed Mar. 21, 1983 in the name of Fergason, entitled ENCAPSULATED LIQUID CRYSTAL AND METHOD, assigned to Manchester R&D Partnership, the disclosure of which is hereby incorporated by reference. Reference may also be made to U.S. Pat. No. 4,435,047, issued Mar. 6, 1984, in the name of Fergason, entitled ENCAPSULATED LIQUID CRYSTAL AND METHOD, assigned to Manchester R&D Partnership, which disclosure is also hereby incorporated by reference.

The operationally nematic liquid crystal is contained in a containment medium that forms volumes of liquid crystal material. The liquid crystal may be contained in discrete capsules or in a containment medium that tends to form a multitude of capsule-like environments wherein the capsules may be interconnected by channels containing liquid crystal material. In the field-off condition, or any other condition which results in the liquid crystal being in a distorted or randomly aligned state, the liquid crystal structure is distorted to a curved form (hence curvilinearly aligned) wherein the spatial average orientation of the liquid crystal over a capsule-like volume, for instance, is strongly curved and there is no substantial parallel directional orientation of the liquid crystal in the absence of a prescribed input.

Preferably, the operationally nematic liquid crystal has a positive dielectric anisotropy, and has an ordinary index of refraction that substantially matches that of the containment medium. Such material will cause scattering of light incident thereon in the field-off or relatively free state. This liquid crystal material, described in detail in the above-identified U.S. Pat. No. 4,435,047, may be designated encapsulated operationally nematic liquid crystal material or nematic curvilinearly aligned phases ("NCAP") liquid crystal material.

The present invention, however, is not limited in use to NCAP configured liquid crystal. Certain embodiments of the invention may be employed with any of the various types of liquid crystal materials or configurations thereof that selectively scatter and/or absorb or transmit light in response to a prescribed input.

Usually liquid crystal is anisotropic both optically and, for example in the case of nematic liquid crystal, electrically. The optical anisotropy is manifest by the scattering of light when the liquid crystal is in random alignment, and the transmission of light through the liquid crystal when it is in ordered alignment. The electrical anisotropy may be a relationship between the dielectric constant or dielectric coefficient with respect to the alignment of the liquid crystal material.

The present invention relates to improvements in displays as well as to the utilization of the light scattering characteristic of liquid crystal materials in displays. The invention also relates to the use of such materials and characteristics, for example, to obtain relatively dark characters or information displayed on a relatively bright background in both small and large size displays. Additionally, an embodiment of the present invention provides a display in which front surface glare is all but eliminated.

An object of the present invention is to provide a display having a relatively high quality of optical brightness and contrast.

Another object of the present invention is to provide a display including an optical system for enhancing the display of information, the information displayed being vividly contrasted to its background.

A further object of the present invention is to provide a liquid crystal display wherein focused light and scattered light are utilized to create a dark character on a very bright background.

A still further object of the present invention is to provide a display wherein front surface glare is all but eliminated.

As may be seen hereinafter, the display disclosed herein is one which may include an optical means for presenting an absence of light over a viewing angle and means for selectively scattering or transmitting light in response to a prescribed input to effect a display of information within the viewing angle.

A liquid crystal means may be utilized for selectively scattering or transmitting light in response to a prescribed input. The optical means may present an absence of light over the viewing angle by focusing light transmitted by the liquid crystal means onto a target means. The liquid crystal means may comprise NCAP liquid crystal. Materials other than liquid crystal, such as electrophoretic materials, which scatter light on one hand and transmit it on the other, however, may also be utilized in the context of the present invention.

The target means may comprise a black absorber for absorbing at least substantially all of the light incident thereon. The optical means may comprise a reflecting concave means for focusing light transmitted by the liquid crystal means within a controlled viewing angle onto a target means disposed between the liquid crystal means and the reflecting means.

In another embodiment, the optical means may comprise a lens means disposed between the liquid crystal means and the target means for focusing light from an observer within a prescribed viewing angle onto the target means. This embodiment also is preferably illuminated from the rear.

In yet another embodiment, the optical means may comprise a concave reflector means located on a non-viewing side of the liquid crystal means to focus light onto a light absorbing target means located on a viewing side of the liquid crystal means. The reflector means and the liquid crystal means present a concave surface to light incident thereon. This embodiment not only enhances contrast but eliminates front surface glare.

The concept of this embodiment provides a method and apparatus for reducing glare from a display by focusing specular reflection from a concave reflecting surface onto a light absorbing target means. This embodiment is not limited to use with materials that transmit or scatter light in response to a prescribed input. The concave configuration of this embodiment provides for glare reduction in both electro-optical and non-electro-optical devices. For example, the concept of this embodiment may be utilized to reduce glare from a white-faced chalkboard or a glossy-faced sign.

The prescribed input is preferably of the electromagnetic type and, more particularly, an electric field. The apparatus may include electrodes for applying the electric field. The electrodes may be located on opposite sides of the liquid crystal means. Substantially optically transparent substrate means may support the electrode means, and a circuit means may be provided to selectively energize the electrode means to apply the electric field.

In accordance with one aspect of the present invention, a liquid crystal display, such as a billboard, can produce relatively dark characters, information, etc. on a relatively dark characters, information, etc. on a relatively bright or white background. The bright background may be produced by liquid crystal material that is randomly aligned in the field-off state wherein light incident on the liquid crystal material is scattered. The dark character is caused, for example, by liquid crystal material that is in a field-on state or in ordered alignment and, thus, substantially optically transparent such that incident light is appropriately focused onto the target means. When the liquid crystal material is randomly aligned, only the relatively bright background appears. When a selected portion of the liquid crystal material is orderly aligned, a very dark character may appear against the very bright background to an observer within the viewing cone or viewing angle of the display. The foregoing may be accomplished using relatively low power requirements and minimum liquid crystal material.

The display of the present invention will be described in more detail hereinafter in conjunction with the drawings wherein:

FIGS. 1 and 2 are schematic views that illustrate a liquid crystal apparatus in the field-off and field-on states, respectively, that may be utilized in the present invention;

FIG. 3 is a schematic, side elevational view illustrating one embodiment of the display of the present invention;

FIG. 4 is a schematic ray trace illustrating the operation of the embodiment of FIG. 3;

FIG. 5A is a schematic, side elevational view illustrating another embodiment of the display of the present invention;

FIG. 5B is a perspective view illustrating a further embodiment of the display of the present invention;

FIG. 6 is a schematic ray trace illustrating the operation of the embodiment of FIG. 5B;

FIG. 7 is a schematic, side elevational view illustrating yet another embodiment of the display of the present invention;

FIG. 8 is a front elevational view of the embodiment of FIG. 7; and

FIG. 9 is schematic ray trace illustrating the operation of the embodiment of FIGS. 7 and 8.

Referring now to the drawings, attention is first directed to FIGS. 1 and 2. FIGS. 1 and 2 show a liquid crystal apparatus indicated generally by reference numeral 10. The apparatus includes a layer or layers of liquid crystal 11 supported on a substrate 12 having an electrode 13 located thereon. The apparatus may further include a second electrode 14 mounted on a substrate 18.

The liquid crystal may comprise any liquid crystal material or configuration of liquid crystal material which selectively scatters or transmits light in response to a prescribed input. For example, the liquid crystal may by configured as a twisted nematic apparatus. In a preferred embodiment, the liquid crystal is configured in a curvilinear manner (NCAP). A primary feature of the present invention is that the liquid crystal material will scatter light impinging thereon when in a field-off or random alignment state, and in the field-on or orderly aligned state the liquid crystal material will be substantially optically transparent.

Additionally, materials other than liquid crystal which scatter light on one hand and transmit it on the other in response to a prescribed input may be utilized in the context of the present invention. For instance, an electrophoretic material may be used.

The use of NCAP configured liquid crystal permits substrates 12 and 18 to be flexible. This allows, as will be discussed in more detail below, the construction of a display in which front surface glare is all but eliminated. Particularly, the NCAP configured liquid crystal material disposed between the flexible electrode-coated substrates provide a flexible film that may be utilized to form a curved front surface of a display.

A voltage may be applied to electrodes 13 and 14, and hence across liquid crystal 11 from a conventional voltage source 16. Voltage source 16 may be connected to the electrodes by electrical leads through a switch 17. When the switch 17 is closed, the electrodes are energized and apparatus 10 is in a field-on state with the molecules of the liquid crystal material in the desired alignment to permit the transmission of light. When the switch is open, the electrodes are de-energized and apparatus 10 is in a field-off state such that the liquid crystal scatters light.

The NCAP configured liquid crystal material, which is schematically illustrated in FIGS. 1 and 2, may include a liquid crystal material 20 more or less contained within the confines or the interior volume 21 of a capsule 22 or an encapsulating medium. The NCAP configured liquid crystal material comprises a plurality of such capsules or an encapsulating medium in which liquid crystal material is dispersed.

Each capsule may be discrete or alternatively the liquid crystal material 20 may be contained in a containment medium 23, such as a latex medium as will be hereinafter discussed, that tends to form a multitude of capsule-like environments containing the liquid crystal material. In this regard, the liquid crystal material 20 may be more or less confined to an approximately spherical or otherwise curvilinear surface of a containment cavity. Such cavities, however, may be interconnected, for example, by one or more channels or passages. The liquid crystal material would preferably be in both the discrete volumes or cavities and in the interconnecting passages. Thus, the internal volumes of respective capsules may be fluidly coupled via one or more interconnecting passages. All of the aspects and features of the present invention vis-a-vis individual unconnected capsules have been found to be applicable to an arrangement of capsules that have one or more interconnecting passages.

Preferably, liquid crystal material 20 is nematic liquid crystal material having positive dielectric anisotropy. Nematic liquid crystal material has fluid-like properties that facilitate the conformance or the distortion thereof to the shape of the capsule wall in the absence of an electric field. On the other hand, in the presence of an electric field such nematic material will relatively easily change to ordered alignment with respect to such field.

Liquid crystal material of a type other than nematic or combinations of various types of liquid crystal material and/or other additives may be used with or substituted for the nematic liquid crystal material as long as it is operationally nematic in the containment medium. However, cholesteric and smectic liquid crystal material generally are bulk driven. It is more difficult to break up the bulk structure thereof for conformance to capsule wall shape and energy considerations in the capsule.

As shown in FIG. 1, in the field-off state, the molecules of liquid crystal, depicted as dashed lines, conform to the shape of the cavity containing the liquid crystal. The directional orientation of a layer of liquid crystal molecules may be distorted to curve in the direction that is parallel to a proximate area of the wall surface 25 of a cavity. More generally, all that is required is that the interaction between the cavity wall 25 and the liquid crystal material 20 produces an orientation in the liquid crystal near that wall that is generally uniform and piecewise continuous, so that the spatial average orientation of the liquid crystal material over the capsule volume is strongly curved and there is no substantial parallel direction of orientation of the liquid crystal structure. It is this strongly curved orientation that results in the scattering and polarization insensitivity (the liquid crystal material is insensitive to the direction of optical polarization of incident light) in the field-off condition.

In the field-on condition (See FIG. 2), or any other condition which results in the liquid crystal being in ordered or parallel alignment, the liquid crystal material 20 will transmit substantially all the light incident thereon and will tend not to be visible. The light that is transmitted is that which is focused onto a target means to optically enhance a display, as discussed below. On the other hand, as noted, in the field-off condition when the liquid crystal is in distorted or random alignment, some of the incident light will be absorbed, but most of the incident light will be scattered.

The index of refraction of containment medium 23 and the ordinary index of refraction (the index when an electric field is applied) of the liquid crystal material 20 should be matched as much as possible when in the field-on state to avoid scattering. However, when the liquid crystal material is in the field-off state, there will be a difference in the indices of refraction at the boundary of the liquid crystal material 20 and the wall of capsule 22, for example. Specifically, the extraordinary index of refraction (the index with no electric field) of the liquid crystal is greater than the index of refraction of medium 23. This causes refraction at that interface or boundary and, thus, scattering.

As long as the ordinary index of refraction of the liquid crystal material is closer to the index of refraction of the containment medium, than is the extraordinary index of refraction, a chance in scattering will result when going from field-on to field-off states, and vice-versa. For any given index of refraction, maximum contrast results when the ordinary index of refraction of the liquid crystal matches the index of refraction of the medium. The closeness of the index matching will be dependent on the desired degree of contrast and transparency in the device, but the ordinary index of refraction of the liquid crystal and the index of the containment medium will preferably differ by no more than 0.03, more preferably, 0.01, especially 0.001.

Preferably, the electric field E (See FIG. 2) is applied to the liquid crystal material 20 for the most part rather than being dissipated or dropped substantially in the containment medium. There should not be a substantial voltage drop across or through the material of which the containment medium is formed. Rather, the voltage drop should occur across the liquid crystal material 20 within the volume 21 of the capsule 22.

Additionally, the electrical impedance of the containment medium preferably should in effect be large enough relative to that of the liquid crystal such that a short circuit will not occur exclusively through the medium to bypass the liquid crystal.

The dielectric constant of the material of which the containment medium is formed and the dielectric coefficient of the liquid crystal, and the effective capacitance values of the containment medium, particularly in a radial direction, and of the liquid crystal material across which the electric field E is imposed, all should be so related that the containment medium does not substantially drop the magnitude of the applied electric field E. Ideally the capacitance dielectric constants (coefficients) of the entire layer of NCAP liquid crystal should be substantially the same of the field-on condition.

The liquid crystal material 20 will have a dielectric coefficient value that is anisotropic. It is preferable that the dielectric constant of the containment medium be greater than the dielectric coefficient of the liquid crystal material 20. The differential between the dielectric coefficient for the liquid crystal material 20 when no electric field is applied, which should be rather small, and the dielectric coefficient for the liquid crystal material when it is aligned upon the application of the electric field, which should be relatively large, should be as large as possible. The critical relationship of dielectric values and applied electric field should be such that the field applied across the liquid crystal material in the containment medium is adequate to cause alignment of the liquid crystal with respect to the field. The relationship between the dielectric constant of the containment medium and the dielectric coefficient of the liquid crystal 20 may be achieved when the liquid crystal has a positive dielectric anisotropy.

In accordance with the present invention, substrates 12 and 18, and electrodes 13 and 14 are optically transmissive so that liquid crystal apparatus 10 can control the transmission of light therethrough in response to the application of an electric field. Electrode 13 may, for example, form a single common electrode surface while electrode 14 comprises a patterned electrode having multiple electrode portions that can be selectively energized to apply the electric field to selected portions of the liquid crystal material. For instance, as is well known in the art, electrode 14 may be divided into seven electrically isolated segments, each of which may be selectively energized to display various numerical characters. Electrode 14 could also be configured to form a dot matrix display comprising a plurality of dots or pixels arranged in column and rows. A row is enabled to accept display information in parallel via the column lines.

Preferably, a plurality of NCAP liquid crystals are applied to substrate 18 in a manner such that the NCAP liquid crystals adhere to electrode 14 and substrate 18. The material of which capsule 22 is formed is suitable for binding or otherwise adhering the capsule to the electrode and/or substrate. In one embodiment, capsule 22 is formed of a polyvinyl alcohol (PVA). In a preferred embodiment, the liquid crystal material is dispersed or entrapped in a latex containment medium. In either embodiment, substrate 18 may be a polyester film, such as Mylar ®, that has been precoated with a layer of indium tin oxide (ITO) to form electrode 14. Preferably, the film has been precoated with a 90 to 500 ohms per square layer of ITO, and most preferably with a 450±150 ohms per square layer of ITO. Of course, materials other than ITO may be used to form the electrodes of the apparatus of the present invention. A Mylar ® film with a precoated ITO electrode, known as Intrex, may be purchased from Sierracin of Sylmar, California. Such an electrode-coated film is very flexible.

As noted, latex entrapped NCAP liquid crystal is used in a preferred embodiment. Latex entrapped NCAP liquid crystal comprises the entrapment of liquid crystal in a latex medium. The latex is a suspension of particles. The particles may be natural rubber or synthetic polymers or copolymers. A latex medium is formed by drying a suspension of such particles. A further explanation of latex entrapped NCAP liquid crystal and methods of making the same are provided in U.S. patent application Ser. No. 591,433, filed Mar. 20, 1984, in the name of Pearlman, entitled LATEX ENTRAPPED NCAP LIQUID CRYSTAL COMPOSITION, METHOD AND APPARATUS, assigned to the assignee of the present invention, and which disclosure is hereby incorporated by reference.

Briefly, latex entrapped NCAP liquid crystal may be formed by mixing a suspension of latex particles and liquid crystal material wherein the liquid crystal material has been previously emulsified in an aqueous phase. Alternatively, all components may be combined prior to emulsifying the liquid crystal material. The mixture may then be applied to substrate 18 and electrode 14. As the mixture dries, it adheres to the electrode-coated side of the polyester film. When dried, the latex particles form a latex medium with particles of liquid crystal dispersed therein.

A specific method for making latex entrapped NCAP liquid crystal may comprise first emulsifying 36 grams of the liquid crystal ROTN701 (manufactured by Hoffman La Roche of New York, N.Y.) in a solution containing 14 grams of a 12% aqueous solution of PVA and 1 gram of the surfactant TWEEN 20 (available through ICI Americas Incorporated of Wilmington, Del.). The liquid crystal is added continuously while the solution is mixed with an impeller blade at 3500 RPM. When the particle size of the liquid crystal is about 1–5 microns, 49 grams of Neorez R-967 (manufactured by Polyvinyl Chemical Industries, Wilmington, Mass.), containing 40% latex particles by weight, is added with slow mixing of less than 1000 RPM until the mixture is homogenous. This material may then be cast with a doctor blade or other suitable means onto substrate 18 and electrode 14.

After the NCAP liquid crystal material has dried onto electrode 14 and substrate 18, substrate 12 and electrode 13 may be laminated onto the surface of the latex entrapped NCAP liquid crystal material. Substrate 12 may also be a flexible, Mylar ® film precoated with a 90 to 500 ohms per square, most preferably a 450±150 ohms per square, layer of ITO to form electrode 13.

In accordance with an aspect of the present invention, light, for example that represented by a light beam 19 (see FIGS. 1 and 2), incident on the liquid crystal material will be scattered to yield a white or bright appearance from a viewing area or side 30 when the liquid crystal is in a field-off or random alignment state, and a dark appearance when the liquid crystal material, or a selected portion thereof, is in a field-on or ordered alignment state. The present invention enhances the effective contrast between the characters or information displayed and the background.

It is noted that light incident on apparatus 10 will be refracted, due to a mismatch in indices of refraction, as it passes through the different materials that comprise apparatus 10. Apparatus 10 may be used, for example, in an air environment, represented by the reference numeral 40. The air forms an interface 42 with the substrate 12 at the front side or from the viewing direction 30.

As shown in FIG. 1, the liquid crystal material 20 is in a random alignment when in the field-off state. Incident light beam 65 enters substrate 12 at the interface 42 and is refracted, (see light beam 65a) ultimately impinging as incident light beam 70a on the layer of liquid crystal. The random or distorted liquid crystal material will scatter the light incident thereon. There are several possibilities of how such incident light beam 70a would tend to be scattered.

For example, one possibility is that the incident light beam 70a will be directed according to the dotted line 70b through the layer of liquid crystal material toward the non-viewing side 32 thereof. Light beam 70b may impinge, as will be discussed below, on a reflective surface at the non-viewing side to be reflected as light beam 70c back to the layer of liquid crystal material where it will be treated as another independently incident light beam thereto, just like the light beam 70a from which it was derived. Therefore, such light beam 70c will undergo scattering, further enhancing the brightness of the background of the display.

Another possibility is that the incident light beam 70a, or that derived therefrom, such as the light beam 70c, will be scattered toward the interface 42 at an angle that is so close to normal at that interface that the light beam will pass through the interface 42 into the medium 40 to be viewed by an observer or observing instrument. Light beam 70d represents such a light beam emitted from the apparatus 10. It is that light, for example, the sum of such emitted light beams 70d, which exits at the interface 42 that causes the liquid crystals to give the appearance of a white or bright background when viewed from the viewing side 30.

Referring to FIG. 2, the field-on or ordered alignment state and operation of the liquid crystal apparatus 10 are shown. Particularly, an electric field E has been applied between electrode 13 and electrode 14. For instance, if electrode 14 is configured to form a figure-eight pattern, selected conductive segments may be energized to display the desired numeral. The light beams 72 and 74, for instance, would be transmitted through the aligned and, thus, effectively transparent or non-scattering liquid crystal material located between the energized electrodes.

Light beams 72 and 74 will be focused, as discussed below, by an optical means on a target means. The sum of such focused light beams display the selected numeral, character or other information to an observer at the viewing location 30. Particularly, to an observer at viewing side 30, the area between the energized electrodes may appear very dark wherein the light beams are focused onto a target means comprising a black absorber for absorbing at least substantially all of the light incident thereon.

The liquid crystal material that is not located between the energized electrodes is still in the field-off state. Thus, the material still scatters light incident thereon from both the viewing and non-viewing sides. Therefore, the numerals or other information displayed appear as very dark characters against a very brilliant or white background.

One embodiment of the present invention is illustrated in FIG. 3. This embodiment includes a liquid crystal apparatus 10 as part of a laminated display assembly comprising a target means 50 and a reflecting means 52. The target means and the reflecting means form a back plane of the display. Light incident on apparatus 10 from the front or viewing side 30 thereof is either scattered or transmitted therethrough. The transmitted light is focused onto the target means by the reflecting means. Whether such incident light is focused or defocused (scattered) depends on whether an electric field is applied to the liquid crystal or some portion thereof.

The reflecting means may comprise an array of cylindrical mirrors 54 having a radius of curvature R. Mirrors 54 present a concave surface to light incident thereon. The mirrors may be formed by partial cylinders; for example, they may be formed from one-eighth to one-quarter cylinders. The dimensions of the mirrors in the "x" or horizontal direction is substantially equal to the dimension of the display in that direction. The number of mirrors in the array is dependent upon the height or dimension of the display in the "y" or vertical direction.

The target means is disposed between the reflecting means and the liquid crystal means. The target means may comprise a plurality of black stripes 56 for absorbing substantially all of the light incident thereon. Stripes 56 may be formed on an optically transparent substrate 57. Alternatively, for a colored display, the target means could comprise colored stripes for abosrbing only one or more specified wavelengths of light.

Targets 56 may be located at a distance "d" of between 0.4 R and 0.5R from mirrors 54 (See FIG. 4). Most preferably, targets 56 are located inwardly of the focal point of the mirrors. Optimally, in order to prevent the phenomenon of coma, they are located at a distance "d" of 0.469R from the mirrors.

The targets' dimension in the "x" direction is substantially equal to the dimension of the mirrors in that direction. As a result, the viewing angle of the display in the "x" direction or plane is approximately 180°. For instance, if the display is located in a room, an observer at the front or viewing side 30 of the display would be able to see the information displayed, ignoring for the moment the limitation on the viewing angle in the "y" direction, from a wide angle within the room.

The angle of view "A" of the display in the "y" direction or plane is limited. This angle of view is dependent upon the height "h" of the target (See FIG. 4). Particularly, the greater the height "h" the wider the angle of view "A". Mathematically, the angle of view "A" is represented by the equation $2 \arctan h/2f$ where "h" is the height of the target and "f" is the focal length of the mirrors of the optical system. As is known, $f = R/2$.

Therefore, an increase in the viewing angle "A" may be obtained by increasing the height of the target. An increase in the viewing angle is, however, achieved at the expense of a loss of contrast between the information displayed and its background. That is, the taller the target the less brilliant is the display. A good trade off between viewing angle and contrast is obtained for a target height "h" of about 0.125R. This height provides a viewing angle "A" of approximately 20° (±10), and the loss of brightness of the display is only about 20%. A viewing angle "A" of ±10° is suitable for most applications, for example, billboard displays which are viewed from relatively long distances and automobile dashboard displays which are viewed at relatively short distances. Generally speaking, if a display is to be viewed from a relatively short distance, the viewing angle "A" should be wider than a display which is to be viewed at a relatively long distance.

The liquid crystal apparatus 10 is preferably located at a distance R from mirrors 54. As noted, light transmitted by apparatus 10 is focused onto a target disposed between a mirror and the selected portion of the liquid crystal apparatus 10 to which a prescribed input, such as an electric field, has been applied.

The ray trace of FIG. 4 illustrates that light, represented by light beams 58a, transmitted by the liquid crystal apparatus in the field-on state impinges on the concave surface of mirror 54 disposed in back of the energized portion of the liquid crystal apparatus. This light is focused, as illustrated by light beams 58b, onto target 56. More particularly, within a prescribed viewing angle or viewing cone "A", light from an observer or observing instrument 90 from viewing side 30 of the display is focused onto the target. Thus, if the target comprises a black absorber, the information displayed by the energized portion of the liquid crystal will appear as a very dark character, numeral, etc. against a very white or brilliant background to an observer 90 within the prescribed viewing angle. The appearance of the display is further enhanced by the fact that some of the light impinging upon the reflecting means will be reflected back to the liquid crystal apparatus to undergo scattering, thereby further increasing the brightness of the display.

The display assembly illustrated in FIG. 3 may be structured in an air environment. However, improved results are obtained, in the sense that the angle of view is increased, if the assembly, including the liquid crystal means, the target means and the reflectors, are supported and contained in a support medium 60 having an index of refraction greater than that of air. Thus, support medium 60 may be formed of such materials as acrylic, polyvinyl alcohol, or polycarbonate.

The above assembly may form one of a plurality of modules which can be stacked in rows and columns to form a larger display. An illumination source on the viewing side of the display may also be provided to enhance the appearance of the display, that is, the contract between the character or other information displayed and the background.

FIGS. 5A and 5B illustrate alternate embodiments of the present invention. These embodiments include a lens system 62, preferably comprising convex lenses, disposed between liquid crystal apparatus 10 and a target means 64. These embodiments also preferably include a backlighting scheme represented by light sources 28 and diffuser 29 (not shown in FIG. 5B).

As shown in FIG. 5A, the lens system 62 may comprise an array of spheres 66 stacked on top of and adjacent to one another to form a plurality of columns and rows of spheres. Alternatively and more preferably, as shown in FIG. 5B, lens system 62 comprises a plurality of cylindrical rods 75 disposed adjacent to one another. The lens means (the rods or spheres) may be formed from such materials as acrylic, polyester, polystyrene, glass, polycarbonates, or various other optically transmissive materials.

In the embodiment of FIG. 5A, the targets comprise a plurality of spots or dots 68 located at the backside of each of the spherical lenses. Preferably, spots 68 are located at the focal point of the lenses, and are thus spaced from the back surface of the lenses for optimum results. In such an arrangement, the targets or spots 68 may be formed in the support medium means 60, or in a substantially optically transparent substrate located behind the lenses. An acceptable display is also obtained if the dots are formed on the back surfaces of the spheres. As discussed heretofore, the targets may comprise black or colored absorbers.

In the embodiment of FIG. 5B, the targets may comprise a line or stripe 77 extending along the back surface of each cylindrical rod 75. Optimally, stripes 77 are spaced from the back surface of the rods to be located at the focal point thereof. The stripes, however, may be coated on the back surface of the cylindrical rods. Stripes 77 may be black or colored absorbers.

The angle of view or viewing cone of the displays of FIGS. 5A and 5B in the "y" direction is limited and dependent upon the size of their respective targets. The angle of view in the "x" direction of the embodiment of FIG. 5B is approximately 180° as discussed with respect to the embodiment of FIG. 3. The angle of view in the "x" direction of the embodiment of FIG. 5A is, however, limited by the size of the target. For a circular spot or target, the angle of view in the "x" direction is equal to the angle of view in the "y" direction.

The ray trace of the embodiment of FIG. 5B is shown in FIG. 6. The height "$h_1$" of the respective stripes 77 determines the angle of view "B" of the display in the "y" direction. The greater the height "$h_1$" the larger is the angle of view. However, as discussed previously, an increase in the angle of view is achieved by a decrease in the brightness of the display.

In the embodiment of FIG. 5B, for an angle of view of 20° ($\pm 10°$), the height "$h_1$" of stripes 77 is approximately equal to one-sixth the diameter of cylindrical rods 75. In the embodiment of FIG. 5A, to achieve approximately the same angle of view, the angle of view in the "x" and "y" directions being equal for a circular target, the diameter of spots 68 may be approximately one-sixth the diameter of spheres 66. The embodiment of FIG. 5A is especially suitable for displays that are to be viewed by an observer at a relatively fixed position, for instance, an automobile dashboard display. This embodiment is less suitable for displays which are to be viewed from widely-varying positions in the "x" direction, for example, a scoreboard display.

The liquid crystal means of either embodiment is preferably spaced from the lens system a distance approximately equal to twice the diameter of the spheres or cylindrical rods. Such positioning provides better uniformity of illumination.

As noted, the embodiments of FIGS. 5A and 5B preferably include a backlighting scheme represented by light sources 28 at the back of non-viewing side 32 of the display (See FIG. 5A). The backlighting scheme may include a diffuser 29 to soften the light from illumination sources 28. The backlighting scheme is utilized to overcome front surface glare, and to enhance the appearance of the display especially when operated other than in bright sunlight.

The light provided by light sources 28 is scattered by the liquid crystal of apparatus 10 in the field-off state to increase the brightness of the background of the display.

If the liquid crystal is in the field-on state, the backlight is invisible to an observer 90 within the prescribed viewing angle "B". Such an observer is only able to see the black image established by the lens system and the target means. Particularly, the target means obscures the light from illumination sources 28 and the lens system focuses the parallel light rays, represented by rays 67a (See FIG. 6), originating from an observer within the prescribed viewing angle "B" onto to the target means as shown by light beams 67b. Therefore, to an observer 90 within the viewing angle "B", the characters or other information in back of the selected energized portion of the liquid crystal will appear very dark against a very white background.

The embodiment illustrated in FIGS. 7 and 8 is an improved display that eliminates front surface glare. This embodiment utilizes the flexible nature of the substrates between which the NCAP liquid crystal is disposed to eliminate front surface glare. Liquid crystal apparatus not utilizing flexible substrates could not perform satisfactorily in this embodiment.

The NCAP liquid crystal apparatus 10, which comprises a flexible film, is formed to present a concave surface to incident light, such as that represented by light beam 19. Disposed immediately behind the NCAP liquid crystal apparatus is a reflector means 80 presenting a concave, reflecting surface to incident light. The reflector means may comprise a positive concave mirror having a radius of curvature R. The radius of curvature of the NCAP apparatus would also be R.

The reflector means 80 may be constructed by coating the surface of a substrate 80a, such as one made from glass, metal or plastic, with a thin layer of a reflecting metal 80b, such as aluminum or silver. The electrode 14 of NCAP apparatus 10 may be formed on substrate 18, and reflector means 80 suitably laminated to that substrate. Alternatively, substrate 18 may be eliminated, and electrode 14 formed on the surface of the reflector means by etching that surface to form the desired electrode pattern.

A target 82 is disposed in front of or on the viewing side 30 of the liquid crystal apparatus. The target may be located at a distance "$d_2$" of between 0.4R and 0.5R from reflector 80. Preferably, the target is located inwardly of the focal point of reflector 80 at a distance of 0.469R from the reflector. In a preferred embodiment, the target is L-shaped comprising vertical and horizontal surfaces 82a and 82b, respectively. These surfaces may comprise black or colored absorbers.

The viewing angle in the "x" direction of the display is a function of the width "$w_2$" of surfaces 82a and 82b. For a viewing angle of 90°, the width "$w_2$" is preferably equal to the width of the display plus the radius of curvature R of reflector means 80. Particularly, surfaces 82a and 82b extend beyond the display by a distance R/2 at each side thereof such that the dimension "$w_3$" is equal to R/2 (see FIG. 8).

The height "$h_2$" of surface 82a and the length "$l_2$" of surface 82b (See FIG. 8) determine viewing angle "C" in the "y" direction. For a viewing angle "C" of 20° ($\pm 10°$), the height "$h_2$" is approximately 0.0625R, and the length "$l_2$" of horizontal surface 82b is approximately 0.1R or greater. The angle of view "C" is related to the height of the target by the equation 2 arctan $h_2/2f$ where "f" is the focal length of reflector means 80.

The target 82 may be modified by replacing the horizontal and vertical absorbing surfaces with a single vertical absorbing surface located at approximately the focal point of the reflector. For a viewing angle in the "y" or vertical direction of 20° (35 10°), the height of the single vertical surface would be approximately 0.125R. The width of such a vertical surface determines the angle of view in the "x" direction, as discussed with respect to surfaces 82a an 82b. The target may also include a hood for shielding the light-absorbing surfaces of the target from direct sunlight. For instance, a hood 86 may be utilized to shield surfaces 82a and 82b.

As shown by FIG. 9, light incident on the display, represented by light beams 85a, within a controlled viewing angle "C" impinges on the reflecting surface of reflector 80 where it is focused onto the horizontal and vertical surfaces of target 82, as shown by light beams 85b. The light that is focused on the target, where the target is a black absorber, presents an extremely dark image or display to an observer 90 within the prescribed viewing angle.

The glare on the front surface of the display of this embodiment is specular. This embodiment eliminates that glare by focusing it onto the target, or at least the glare at the energized portion of the NCAP liquid crystal. The glare at the de-energized portion of the liquid crystal is not a problem.

The glare-reduction display of FIG. 7 as well as the other embodiments discussed are adaptable to such displays as outdoor billboards, indoor display signs, automobile dashboard displays, window mounted displays, gas price signs, time and temperature signs, and scoreboards both portable and fixed.

Ideally, if the display of information is to be observed from above, the target should be located at bottom of the display. Conversely, if the display of information is to be observed from below, the target should be at the top of the display. The embodiment depicted in FIG. 7 may be utilized as billboard which would be observed from below the display. In this embodiment, the target is located at the bottom of the display to prevent shadows from being cast onto the display, which is contary to the preferred arrangement of the target and the display.

The display of FIG. 7 may use cylindrical, hyperbolic, parabolic, or elliptical cross-sections to reduce target size or improve the dimensions of the display apparatus. A support medium means 60 may be used to support and contain the reflector and liquid crystal means.

As noted, present invention is not limited to use with liquid crystal materials. The embodiment of FIG. 7, for instance, may be used to reduce or eliminate specular glare from almost any type of display where such glare is a problem, for example, a white-faced chalkboard or a glossyfaced billboard. In this context, this embodiment will comprise a light absorbing target and a concave reflector means for focusing specular reflection onto the target.

The present invention may also be used in alternate embodiment wherein bright characters are displayed on a relatively dark background. In such an embodiment, the liquid crystal material located in the display segments used to form the character or information displayed would be in a field-off state such that light is scattered to create characters having a bright appearance. The liquid crystal material in the display segments surrounding the character segments would be in a field-on state such that light is appropriately focused onto suitable targets to create a relatively dark background.

Although certain specific embodiments of the invention have been described herein in detail, the invention is not to be limited only to such embodiments, but rather only by the appended claims.

What is claimed is:

1. A display comprising means having two states, one state for scattering incident light and a second state for transmitting incident light as a response to a prescribed input independent of the incident light, and focusing means for directing unscattered light transmitted through said scattering or transmitting means onto a light absorbing target means external to and on a non-viewing side of said scattering or transmitting means for enhancing the contrast of the display.

2. The display of claim 1 wherein said scattering or transmitting means comprises a liquid crystal means.

3. The display of claim 2 wherein said liquid crystal means comprises at least one layer of nematic curvilinearly aligned phases liquid crystal material.

4. The display of claim 1 wherein said optical means has a focal point and said target means is located at approximately said focal point.

5. The liquid crystal apparatus of claim 4 wherein said target means comprises a black absorber for absorbing substantially all of the light incident thereon or a colored absorber for absorbing only one or more specified wavelengths of light.

6. A display, comprising:
   means selectively operable for affecting light incident thereon and having two states, one state for scattering light and a second state for transmitting light in response to a prescribed input independent of the incident light;

a target means located on a non-viewing side of said selectively operable means for absorbing light incident thereon; and a lens means disposed between said selectively operable means and said target means for directing light transmitted through said selectively operable means onto said target means to enhance the contrast of the display.

7. The display of claim 6 wherein said selectively operable means comprises a liquid crystal means.

8. The display of claim 7 wherein said liquid crystal means comprises at least one layer of nematic curvilinearly aligned phases liquid crystal material.

9. The display of claims 6, 7 or 8 further including an illumination source on the non-viewing side of the display for directing light toward said lens means.

10. The display of claim 9 wherein said lens means comprises a plurality of cylindrical rods disposed adjacent to one another.

11. The display of claim 10 wherein said target means comprises a stripe extending substantially along the length of each of said cylindrical rods.

12. The display of claim 11 wherein said target means is positioned between the backsurface of said lens means and the focal point thereof.

13. The display of claim 12 wherein said strip comprises a black absorber for absorbing at least substantially all of the light incident thereon or a colored absorber for absorbing only one or more specified wavelengths of light.

14. The display of claim 12 wherein the height of said stripes is approximately equal to one sixth the diameter of said cylindrical rods.

15. The display of claim 12 wherein said selectively operable means is spaced from said cylindrical rods a distance approximately equal to twice the diameter thereof.

16. The display of claims 6, 7 or 8 wherein said lens means comprises a plurality of spheres disposed adjacent to one another.

17. The display of claim 16 wherein said target means comprises a dot located at the backside of each of said spheres.

18. The display of claim 17 wherein said dot is positioned between the backside of said spheres and the focal point thereof.

19. The display of claim 18 wherein the diameter of said spots is approximately equal to one-sixth the diameter of said spheres.

20. The display of claim 18 wherein said dot comprises a black absorber for absorbing at least substantially all of the light incident thereon or a colored absorber for absorbing only one or more specified wavelengths of light.

21. The display of claim 18 wherein said selectively operable means is spaced from said spheres a distance approximately equal to twice the diameter thereof.

22. A method for contrast enhancement, comprising:
scattering or transmitting incident light by means of an electro-optical device as a response to a given electrical input independent of incident light, said electro-optical device having two states, a first state for scattering light and a second state for transmitting light; and focusing unscattered light transmitted through said electro-optical device onto a light absorbing target means external to and on a non-viewing side of said electro-optical device for enhancing contrast.

23. A display, comprising:
liquid crystal means operable for affecting light incident thereon and having two states, one state for scattering light and a second state for transmitting light in response to a prescribed input independent of the incident light;

a target means located on a non-viewing side of said liquid crystal means for absorbing light incident thereon; and a plurality of cylindrical lenses disposed between said liquid crystal means and said target means for directing light transmitted through said liquid crystal means onto said target means to enhance the contrast of the display.

24. The display of claim 23 wherein said lenses comprise cylindrical rods.

* * * * *

UNITED STATES PATENT AND TRADEMARK OFFICE
CERTIFICATE OF CORRECTION

PATENT NO. : 4,732,456
DATED : March 22, 1988
INVENTOR(S) : Fergason et al.

It is certified that error appears in the above—identified patent and that said Letters Patent is hereby corrected as shown below:

Col. 6, ln. 17 "chance" should read "change"

Col. 10, ln. 33 "($\pm$10)" should read "($\pm$10°)"

Col. 13, ln. 36 "(35 10°)" should read "($\pm$ 10°)"

Claim 13, ln. 1, "strip" should read "stripe"

Signed and Sealed this

Fourth Day of April, 1989

*Attest:*

DONALD J. QUIGG

*Attesting Officer*   *Commissioner of Patents and Trademarks*